United States Patent [19]

Wada et al.

[11] Patent Number: 4,489,232
[45] Date of Patent: * Dec. 18, 1984

[54] APPARATUS FOR HEATING A MIXED GAS ON AN INTERNAL COMBUSTION ENGINE

[75] Inventors: Shigetaka Wada, Kuwana; Toshio Yamada, Nagoya, both of Japan

[73] Assignee: NGK Insulators, Ltd., Japan

[*] Notice: The portion of the term of this patent subsequent to May 4, 1999 has been disclaimed.

[21] Appl. No.: 310,327

[22] Filed: Oct. 9, 1981

[30] Foreign Application Priority Data

Oct. 13, 1980 [JP] Japan .............. 56-144787[U]

[51] Int. Cl.³ .................. F02M 31/12; H05B 3/12
[52] U.S. Cl. ........................ 219/206; 123/549
[58] Field of Search ............. 219/206, 207, 205, 504, 219/505, 541, 544; 123/545, 548, 549, 552, 557; 338/22 R, 23; 261/142

[56] References Cited

U.S. PATENT DOCUMENTS

| | | | |
|---|---|---|---|
| 4,313,413 | 2/1982 | Miyoshi | 123/548 |
| 4,327,697 | 5/1982 | Wada et al. | 219/207 X |
| 4,361,125 | 11/1982 | Igashira et al. | 219/206 X |
| 4,362,142 | 12/1982 | Igashira et al. | 219/206 X |
| 4,366,798 | 1/1983 | Goto et al. | 219/206 X |
| 4,377,148 | 3/1983 | Ishida | 123/549 X |
| 4,390,000 | 6/1983 | Igashira et al. | 219/207 X |
| 4,395,993 | 8/1983 | Tanaka et al. | 219/206 X |

Primary Examiner—A. Bartis
Attorney, Agent, or Firm—Parkhurst & Oliff

[57] ABSTRACT

An apparatus for heating the fuel mixture of an internal combustion engine includes a cylindrical heating body, adapted to form a passageway between a fuel supply and an internal combustion engine, having a double walled structure formed by spaced inner and outer metallic cylinders. A plurality of plate-like ceramic heating elements having a positive temperature coefficient (PTC) of electrical resistance are inserted between the inner and outer cylinders and are urged into contact with the inner cylinder by a resilient spring member. The cylindrical heating body is sealed by welding, brazing, caulking or packing to form a gas-tight chamber enclosing the ceramic heating elements and isolating them from degradation by the fuel mixture. The cylindrical body is provided with an air hole communicating the chamber with an ambient air vent passage formed in an insulator member attached to the body thereby connecting the interior of the chamber and the ceramic heating elements therein to an external air supply.

3 Claims, 4 Drawing Figures

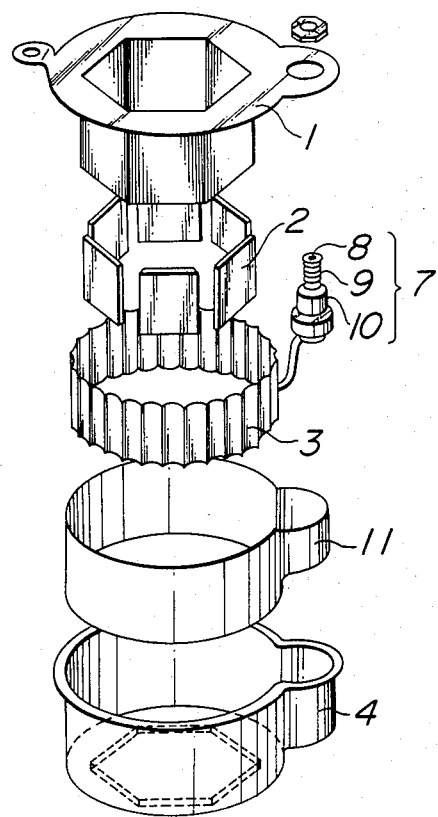

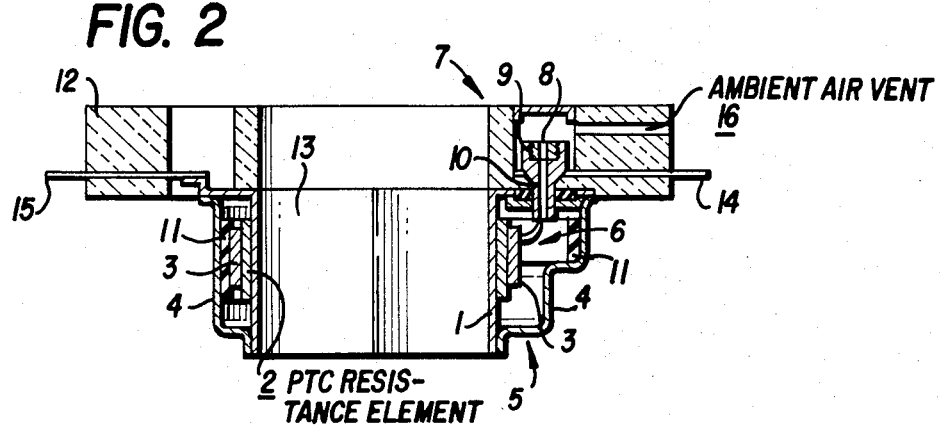
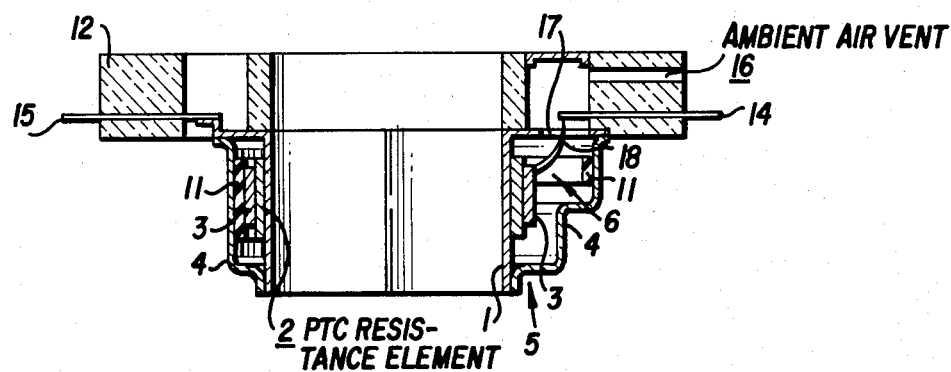
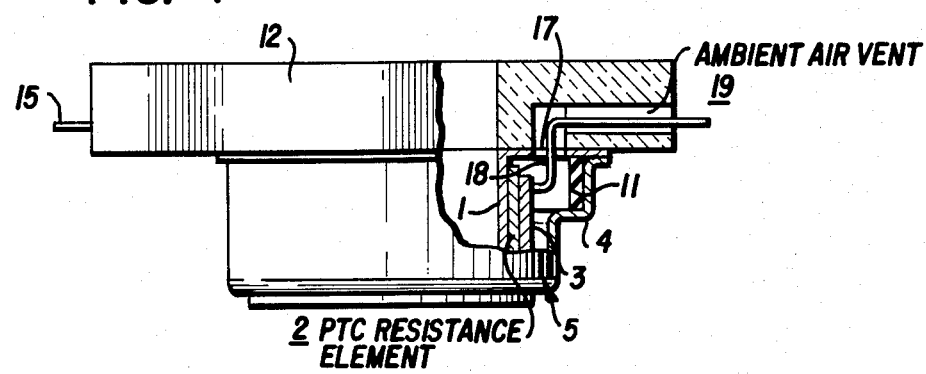

APPARATUS FOR HEATING A MIXED GAS ON AN INTERNAL COMBUSTION ENGINE

BACKGROUND OF THE INVENTION

The present invention relates to an apparatus for heating a fuel mixture used in an internal combustion engine, through which the vaporization of the fuel is promoted, thereby improving the starting performance and driving performance of the engine.

Heretofore it has been proposed that the fuel mixture supplied to the internal combustion engine be heated to promote the vaporization of the fuel and to improve the ignition and combustion of the fuel mixture in the engine, whereby the starting performance of the engine is improved and the generation of uncombusted hydrocarbons and carbon monoxide is reduced, thus improving the fuel consumption ratio. Various apparatuses have been proposed for heating the fuel mixture supplied to the engine. A honeycomb-shaped ceramic having a positive temperature coefficient for electrical resistance (hereinafter referred to as "PTCR") was provided between a carburetor and an intake manifold (U.S. Pat. No. 4,108,125); a cylindrically shaped ceramic, coaxially provided with a cylindrical ceramic on its outer surface, the outer ceramic having a PTCR and electrode layers on its inner and outer surfaces, and being provided in an intake manifold; and a heating apparatus in which a radiating plate having a large number of needle projections provided on a ceramic plate having a PTCR, was fitted in an intake manifold just below a carburetor.

However, a honeycomb-shaped ceramic having a PTCR has a low resistance against mechanical or thermal shock and the ceramic having a PTCR is in direct contact with the fuel mixture, resulting in degradation of the ceramic by fuel compositions and humidity contained in the fuel mixture, or gas blown back from the engine, resulting in a reduction of the breakdown voltage and corrosion of the electrode. Although an electric insulating coating is applied on the ceramic to prevent these defects, the thermal conductivity is poor and this type of coating readily swells and peels off. Moreover, when barium titanate comprises part of the PTCR ceramic, and the ceramic is used for a long period of time an air-tight chamber, the breakdown voltage may be reduced. Therefore, such heating apparatuses cannot be used for a long period of time.

The fitting of a PTCR ceramic in a ceramic cylinder results in defects such as the generation of thermal stresses resulting from differences between thermal expansion coefficients of the different ceramics. Additionally, the dimensions of the ceramics to be fitted together must be precise to result in tight fits therebetween and some type of mechanical working is required on an inner wall of an intake and manifold since the heating apparatus is provided therein. Furthermore, when the PTCR heating apparatus is provided with a radiating plate and fitted to the intake manifold wall, the intake manifold wall is also provided with a fluid passage for a cooling fluid, such as water, or a fluid passage for exhaust gas flow causing heating. Therefore, the heating apparatus is limited in position, the design can become complex, resulting in high manufacturing costs and a correspondingly low commercial value.

SUMMARY OF THE INVENTION

The present invention was made in view of the foregoing background and to overcome the foregoing drawbacks. It is accordingly an object of this invention to provide an apparatus for heating the fuel mixture injected into an engine, the apparatus comprising conventional PTCR ceramics as a heat generator and providing for a heating apparatus which does not cause a reduction of breakdown voltage of the ceramic or corrosive deterioration of the electrode.

Another object of the present invention is to provide a heating apparatus wherein the temperature can be raised rapidly.

A further object of the present invention is to provide a heating apparatus which has a simple and compact structure.

Another object of the present invention is to provide a heating apparatus which can be fitted to a carburetor or an intake manifold without modifying either to hold the apparatus.

The present invention consists of an apparatus for heating the fuel mixture of an internal combustion engine, which comprises a cylindrical heating body, wherein a plurality of ceramics having a PTCR, along with a resilient member for urging the ceramics toward a metal inner cylinder, are inserted between a double walled structure of a cylindrical body consisting of a metal inner cylinder and a metal outer cylinder, all of which are provided in a passageway between the fuel supply and the internal combustion engine. The cylindrical heating body being sealed in a gas-tight manner, by some type of sealing means between the metal inner cylinder and the metal outer cylinder, thereby creating a sealed chamber to prevent the fuel mixture from contacting the ceramics, with the cylindrical heating body provided with an air hole to contact the ceramics to an outer air supply.

BRIEF DESCRIPTION OF THE DRAWINGS

FIG. 1 is an exploded view showing parts for constructing an embodiment of the heating apparatus according to the present invention;

FIG. 2 is a cross-sectional view of the embodiment shown in FIG. 1;

FIG. 3 is a cross-sectional view of another embodiment of the present invention; and FIG. 4 is a partially cut away cross-sectional view showing a further embodiment of the present invention.

DESCRIPTION OF THE PREFERRED EMBODIMENT

FIG. 1 and FIG. 2 show an embodiment of the present invention. A cylindrical body 5 comprises a stainless steel inner cylinder 1, having a regular hexagonal cross-section, and a stainless steel outer cylinder 4, having a circular cross-section and therebetween defining a space 6. A plurality of ceramics 2, having a PTCR, are urged toward an outer circumferential wall of the metal inner cylinder 1 by a resilient corrugated spring 3 for both thermal and electrical effects. The metal inner cylinder 1 and the metal outer cylinder 4 are welded together at an upper end portion and a lower end portion respectively, and the space 6 is thereby sealed in a gas-tight manner with a passage 13 used for the fuel mixture for an internal combustion engine.

The resilient corrugated spring 3 functions as an electric terminal for supplying electric current to the PTCR ceramics and is connected to an electric terminal 7. The electrical terminal 7 is provided in the flange portion of the metal inner cylinder 1 and is provided with a metal tube 9 defining an air hole 8 which communicates with the space 6. The metal tube 9 is also electrically connected to the ceramics 2, but insulated from the flange portion of the cylinder 1 by the bushing 10.

A ring-shaped insulator 11 is provided in the space 6 of the cylindrical body 5 between the resilient corrugated spring 3 and the metal outer cylinder 4, thereby insulating one from the other. The insulator 11 may be comprised of materials such as insulating paper, ceramics, resin and the like. Also, the inner surface of the outer cylinder may be covered with an insulating coating.

The aforedescribed cylindrical heating body is provided between the intake manifold and the carburetor in a fuel passage which carries the fuel mixture to the internal combustion engine. The heating body is attached to a thermal insulator 12 which prevents the transmission of heat generated in the combustion chamber to the carburetor. Electrode plates 14 and 15 are provided in the insulator 12 and are connected to an external supply source. Additionally, an air hole 16 is provided in the insulator 12 and communicated with external air. The electrode plate 14 is screwed to the metal tube 9 of the electric terminal 7, and the electrode plate 15 is electrically connected to the cylindrical body 5 by means of rivets and the like. The air hole 16 is arranged so as to connect with the air hole 8 in the aforedescribed electric terminal 7. The air hole 16 is provided to expose the PTCR ceramics 2 to external air. It is important that moisture, dust and the like do not enter into the cylindrical body 5 through the hole 16. Therefore, it is desirable to arrange an opening portion of the air hole 16 so that it opens downwardly or connects to an L-shaped tube whereby the opening portion is arranged in a position and direction into which water and dust have difficulty in entering through the hole 16.

As a means for forming the air hole, the electrode plate 14 may be formed into a pipe shape whereby the air hole 16 is omitted.

FIG. 3 shows another example according to the present invention, which differs from the example shown in FIG. 1 and FIG. 2 in that the electric current supplied to terminal 7 is not provided in the cylindrical body 5. The metal outer cylinder 4 is provided with an air hole 17 and an electric current supply lead 18, such as lead wire, is provided therein. The supply lead 18 thereby electrically connects the corrugated spring 3 and the electrode plate 14.

FIG. 4 shows another example of the present invention, which differs from the example of FIG. 3, in that no electrode plate 14 is provided in the insulating body 12, but an electric current supply lead 18, provided in an air hole 19, is connected to the corrugated spring 3.

In the aforedescribed examples, a plurality of PTCR ceramics 2 are heated to a given temperature by connecting a supply source to the electrode plates 14 and 15 or to the current supply lead 18 and the majority of heat generated thermally conducts to the metal inner cylinder 1, whereby the fuel mixture of the internal combustion engine is heated.

The plurality of PTCR ceramics must be in thermal contact with the metal inner cylinder, and to enhance the thermal contact, a thermal conductive grease may be applied between an outer wall surface of the metal inner cylinder and the PTCR ceramics. The shape of the PTCR ceramics is such that they fit the shape of the outer circumferential wall of the metal inner cylinder so that the ceramics experience satisfactory thermal contact with the outer circumferential wall of the metal inner cylinder. When the shape of the metal inner cylinder is polygonal or circular, the shape of the PTCR ceramics may be either plate-like or circular, respectively, so long as they have equivalent circumferential surfaces. However, it is preferable to combine a polygonal shaped metal cylinder with the plate-like ceramic to facilitate high thermal contact without excessive designing and manufacturing difficulties associated with combining two cylindrical pieces. Furthermore, it is possible to form the outer circumferential wall of the metal inner cylinder into a polygonal shape and form the inner circumferential wall into a circular shape, but it is preferable to maintain the same shape between the inner circumferential wall and outer circumferential wall so that a minimal amount of thermal energy will be within the metal cylinder at any given moment.

The metal outer cylinder does not substantially heat the fuel mixture and it is therefore unnecessary for it to be heated. Hence, it is desirable for the metal outer cylinder to be thermally insulated from the PTCR ceramics by a thermally insulating paper, a corrugated spring or similar insulating apparatuses, so that the fuel mixture is efficiently vaporized without expending unnecessary electric energy.

The plurality of PTCR ceramics must be isolated from the fuel mixture. Therefore, the metal inner cylinder and the metal outer cylinder must be sealed air-tight by an appropriate means, thereby creating a sealed chamber, by using a packing material, brazing, caulking and the like, but a welding process, such as seam or plasma welding, is excellent in view of the operating temperature of the heating body, the corrosion resistance of the weld, the air tightness of the weld and the easy application of the weld.

Materials which can be used for the corrugated spring are preferred to be ones which do not deteriorate by the generation of heat from the PTCR ceramics, for example, beryllium-copper alloy, phosphor bronze, titanium-copper alloy or stainless steel. The force exerted by the spring upon the PTCR ceramics should be more than 2 kg/cm$^2$ in view of the required thermal and electrical contact between the PTCR ceramics and the metal inner cylinder.

The corrugated spring does not have to be limited to any particular shape, but it must be able to urge the PTCR ceramics against the metal inner cylinder, for example, the spring can be provided with tongues cut and raised from a metal sheet.

As mentioned above, the present invention consists of a heating apparatus in which a plurality of PTCR ceramics are urged and contacted against an outer circumferential wall of a metal inner cylinder, with the resilient member and the PTCR ceramics being sealed in a gas-tight manner, thereby isolating the fuel mixture from the PTCR ceramics. The air hole is provided to place the ceramics in contact with an external air supply, so that the ceramics having a PTCR will not experience a reduction in their breakdown voltage, and the electrodes will not be corroded. Hence, the heating apparatus may be used for a long period of time. Additionally, since the air hole and the electric current supply terminal can be provided at a common position, a simple and small structure can be designed allowing for rapid temperature increases. Furthermore, the PTCR ceramics are the heat generating body, so that the fuel mixture does not over-heat.

Furthermore, the metal inner cylinder serves as a terminal for supplying electric current to the PTCR ceramics and functions as a good thermal conductor, so that the terminal does not inhibit the thermal transmission from the PTCR ceramics to the metal inner cylinder, nor is there any inclusion between ceramics and the metal inner cylinder which inhibits thermal flow. Therefore, the thermal energy generated by the ceramics is rapidly conducted to the metal inner cylinder and the thermal energy in the metal inner cylinder is rapidly transferred to the fuel mixture. Further, the heating body is provided on a heat insulating body outside and separate from the internal combustion engine, so that the heating apparatus attaches without any significant modification to the carburetor or the intake manifold. Additionally, the PTCR ceramics are separated into a plurality of pieces rather than a single piece, so that the thermal conductive contact with the inner cylinder can be easily and satisfactorily effected and the desired resistance value can be easily obtained by a combination of the ceramics resulting in the present invention being commercially valuable.

What is claimed is:

1. An apparatus for heating a fuel mixture of an internal combustion engine, which comprises a plurality of ceramic heating elements having a positive temperature coefficient of electric resistance, along with a resilient member, which are inserted between a double walled structure comprising a metal inner cylinder and a metal outer cylinder, with said resilient member urging said ceramic heating elements into contact with said inner metal cylinder, said inner and outer metal cylinders defining a cylindrical heating body adapted to form a passageway between a fuel supply and an internal combustion engine, the cylindrical heating body being sealed in a gas-tight manner by sealing means between the metal inner cylinder and the metal outer cylinder, thereby creating a sealed chamber, and an insulator in contacting engagement with said cylindrical heating body, the insulator having a conductive means and an air hole extending therethrough, and means electrically connecting said conductive means to said ceramic heating elements and communicating the interior of said sealed chamber with an external air supply through said air hole.

2. The heating apparatus of claim 1, wherein the ceramic heating elements are plate-like in shape and an inner surface and an outer surface of the metal inner cylinder have a polygonal cross-sectional shape.

3. The heating apparatus of claim 1, wherein the sealing means is selected from a group consisting of welding, brazing, caulking or use of a packing material.

* * * * *